United States Patent
Lee et al.

(10) Patent No.: US 10,548,201 B2
(45) Date of Patent: Jan. 28, 2020

(54) SWITCH CONTROLLER, POWER SUPPLY DEVICE COMPRISING THE SAME, AND DRIVING METHOD OF THE POWER SUPPLY DEVICE

(71) Applicant: SEMICONDUCTOR COMPONENTS INDUSTRIES, LLC, Phoenix, AZ (US)

(72) Inventors: Young-Je Lee, Bucheon (KR); Gye-Hyun Cho, Incheon-si (KR); Jae-Yong Lee, Seongnam-si (KR); Yoon-Woong Chung, Seongnam-si (KR); Ji-Hoon Jang, Incheon-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/406,633

(22) Filed: May 8, 2019

(65) Prior Publication Data

US 2019/0268996 A1    Aug. 29, 2019

Related U.S. Application Data

(63) Continuation of application No. 13/889,789, filed on May 8, 2013, now Pat. No. 10,321,540.

(30) Foreign Application Priority Data

May 8, 2012  (KR) ........................ 10-2012-0048815

(51) Int. Cl.
H05B 37/02 (2006.01)
H05B 33/08 (2006.01)

(52) U.S. Cl.
CPC ......... *H05B 37/02* (2013.01); *H05B 33/0818* (2013.01); *Y02B 20/346* (2013.01)

(58) Field of Classification Search
CPC ........................... H05B 33/0818; H05B 37/02
See application file for complete search history.

(56) References Cited

U.S. PATENT DOCUMENTS 7,915,836 B2    3/2011  Cheng
8,344,638 B2    1/2013  Shteynberg et al.

*Primary Examiner* — Lincoln D Donovan
*Assistant Examiner* — Colleen J O Toole
(74) *Attorney, Agent, or Firm* — AMPACC Law Group, PLLC

(57) ABSTRACT

The power supply device includes a power switch including one terminal to which an input voltage is transferred; an inductor including one terminal connected to another terminal of the power switch; a diode connected between a ground and a floating ground; a sensing resistor connected between the floating ground and the one terminal of the inductor. A switch controller compares a modulation sensing voltage depending on a sensing voltage generated from the sensing resistor with a high peak reference and a low peak reference when a LED string is connected between an inductor and the ground. The switch controller controls a switching operation of a power switch according to the comparison result. The high peak reference and the low peak reference are references for controlling an upper limit and a lower limit of an LED current flowing through the LED string, respectively.

18 Claims, 7 Drawing Sheets

PRIOR ART

SWITCH CONTROLLER, POWER SUPPLY DEVICE COMPRISING THE SAME, AND DRIVING METHOD OF THE POWER SUPPLY DEVICE

CROSS-REFERENCE TO RELATED APPLICATION

This application is a continuation of U.S. application Ser. No. 13/889,789, filed May 8, 2013, which claims priority to and the benefit of Korean Patent Application No. 10-2012-0048815 filed in the Korean Intellectual Property Office on May 8, 2012, the entire contents of which are incorporated herein by reference.

BACKGROUND OF THE INVENTION (a) Field of the Invention

An exemplary embodiment of the present invention relates to a power supply device implemented by a buck converter, a driving method of the power supply device, and a switch controller applied to the power supply device.

(b) Description of the Related Art

FIG. 1 is a circuit diagram illustrating a conventional low-side buck converter for driving an LED string.

As shown in FIG. 1, AC power source AC is rectified by passing through a bridge diode 1. The bridge diode 1 full-wave rectifies the AC power source AC. The rectified voltage, that is, an input voltage is supplied to an inductor 2 through an LED string, and the inductor 2 supplies a driving current to the LED by an operation of a power switch S. A switching unit 3 including the power switch S controls a switching operation of the power switch S.

When the power switch S is turned-on, a LED current flowing through the LED string is increased. When the power switch S is turned-off, the LED current is reduced.

The switching unit 3 according to the conventional art controls a switching operation according to a peak of a current flowing through the power switch S. Since a current flows through a diode 4 in the LED string at an off period of the power switch S, a scheme of controlling only a peak of a current flowing through the power switch S has a limitation on Constant Current (CC) control.

Further, sub-harmonic may be prevented in a current control mode by limiting a switching duty to be 50% or less or performing slope compensation. The slope compensation refers to varying a slope of a control signal for controlling a peak current flowing through the power switch. Then, there is a need for a complex circuit to limit a switching duty or to perform the slope compensation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch controller, a buck converter including the same, and a driving method thereof having advantages of improving a CC control characteristic.

A power supply device according to an exemplary embodiment of the present invention includes: a power switch including one terminal to which an input voltage is transferred; an inductor including one terminal connected to another terminal of the power switch; a diode connected between a ground and a floating ground; a sensing resistor connected between the floating ground and the one terminal of the inductor; and a switch controller controlling a switching operation of the power switch using a sensing voltage generated from the sensing resistor, and a high peak reference and a low peak reference for controlling an upper limit and a lower limit of an LED current flowing through an LED string when the LED string is connected between another terminal of the inductor and the ground.

The switch controller may inverting-amplify the sensing voltage, adds a predetermined offset voltage to the amplified voltage to generate a modulation sensing voltage, turns-on the power switch when the modulation sensing voltage reaches the low peak reference, and turns-off the power switch when the modulation sensing voltage reaches the high peak reference.

When the input voltage is generated by full-wave rectifying an AC input, the switch controller may detect a zero crossing time point of the input signal using the modulation sensing voltage, and generate the high peak signal and the low peak signal having a phase and a waveform in synchronization with the input voltage using the detected zero crossing time point.

The switch controller may detect a period when the modulation sensing voltage is less than the low peak reference as a zero crossing detection period, determine the zero crossing time during the detected zero crossing detection period to set one period of the input voltage, and generate the high peak reference and the low peak reference depending on a full-wave rectification sine-wave during the one set period of the input voltage.

The digital sine-wave generator may include a zero crossing detector receiving the modulation sensing voltage and the low peak reference, detecting a period when the modulation sensing voltage is less than the low peak reference as the zero crossing detection period, and generating a zero crossing detection signal according to the detected result; a clock generator receiving the zero crossing detection signal and a predetermined clock signal, estimating continuous zero crossing time points using the zero crossing detection signal, setting an interval between the estimated continuous zero crossing time points as one period of the input voltage, and generating a sine-wave clock signal with edges corresponding to a reference number of times during the one set period of the input voltage; a sine-wave generator generating a first digital signal and a second digital to be increased and reduced corresponding to the reference number of times according to the sine-wave clock signal during the one set period of the input voltage; and a digital-to-analog converter converting the first digital signal and the second digital signal into analog voltage signals, respectively, to generate the high peak reference and the low peak reference.

The clock generator may set an interval between one time during a period when the zero crossing detection signal is at a low level and one time during a period when the zero crossing detection signal is at a next low level as the one period of the input voltage.

The sine-wave generator may serially arrange a plurality of digital values indicating a high peak reference varying for each period of the sine-wave clock signal for each period of the input voltage according to the zero crossing detection signal to generate the first digital signal, and serially arrange a plurality of digital values indicating a low peak reference varying for each period of the sine-wave clock signal to generate the second digital signal.

The switch controller may include a high peak comparator generating an OFF signal for controlling turning-off of the power switch according to a comparison result of the modulation sensing voltage with the high peak reference; a low peak comparator generating an ON signal for controlling turning-on of the power switch according to a comparison result of the modulation sensing voltage with the low peak reference; an SR flip-flop receiving the OFF signal and the ON signal, generating a gate control signal of a level for turning-off the power switch according to the OFF signal, and generating a gate control signal of a level for turning-on the power switch according to the ON signal; and a gate driver generating a gate signal transferred to a gate electrode of the power switch according to the gate control signal.

The switch controller may include an inverting amplifier amplifying the sensing voltage −N times; and an offset adder adding the offset voltage to an output of the inverting amplifier to generate the modulation sensing voltage.

The sensing voltage may be a voltage generated from the sensing resistor based on the floating ground.

A method of driving a power supply device according to an exemplary embodiment of the present invention relates to a power supply device including a power switch having one terminal receiving an input voltage, a diode connected between another terminal of the power switch and a ground, and a sensing resistor between the another terminal of the power switch and an inductor. The method of driving a power supply device includes comparing a modulation sensing voltage according to a sensing voltage generated from the sensing resistor with a high peak reference voltage when an LED string is connected between the inductor and the ground the inductor; comparing the modulation sensing voltage with a low peak reference; and turning-off the power switch according to the comparison result of the modulation sensing voltage with the high peak reference, and turning-on the power switch according to the comparison result of the modulation sensing voltage with the low peak reference, wherein the high peak reference and the low peak reference are references for controlling an upper limit and a lower limit of an LED current flowing through the LED string, respectively.

The method of driving a power supply device may further include inverting-amplifying the sensing voltage, and adding a predetermined offset voltage to the amplified voltage to generate the modulation sensing voltage.

The method of driving a power supply device may further include detecting a zero crossing detection period according to the comparison result of the modulation sensing voltage with the low peak reference; determining a zero crossing time point during the detected zero crossing detection period, and setting continuous zero crossing time points as one period of the input voltage and generating the high peak reference and the low peak reference depending on a full-wave sine wave during the one set period of the input voltage.

The detecting of the zero crossing detection period may include detecting a period when the modulation sensing voltage is less than the low peak reference as the zero crossing detection period.

The generating of the high peak reference and the low peak reference may include: generating a sine-wave clock signal with edges corresponding to a reference number of times during the one set period of the input voltage; generating a first digital signal and a second digital to be increased and reduced corresponding to the reference number of times according to the sine-wave clock signal during the one set period of the input voltage; and converting the first digital signal and the second digital signal into analog voltage signals, respectively, to generate the high peak reference and the low peak reference.

A switch controller according to an exemplary embodiment of the present invention is applicable to a power supply device including a diode supplying a current to an LED string according to a switching operation of a power switch including one terminal to which an input voltage is supplied, the diode being connected between another terminal of the power switch and a ground. The switch controller includes an inverting amplifier inverting-amplifying a sensing voltage generated from a sensing resistor connected to the another terminal of the power switch; and an offset adder adding the offset voltage to an output of the inverting amplifier to generate the modulation sensing voltage, wherein a switching operation of the power switch is controlled using the modulation sensing voltage, and a high peak reference and a low peak reference for controlling an upper limit and a lower limit of an LED current flowing through the LED string.

An exemplary embodiment of the present invention provides a switch controller capable of improving a CC control characteristic, a buck converter including the same, and a driving method thereof.

DETAILED DESCRIPTION OF THE EMBODIMENTS

Figure 1:
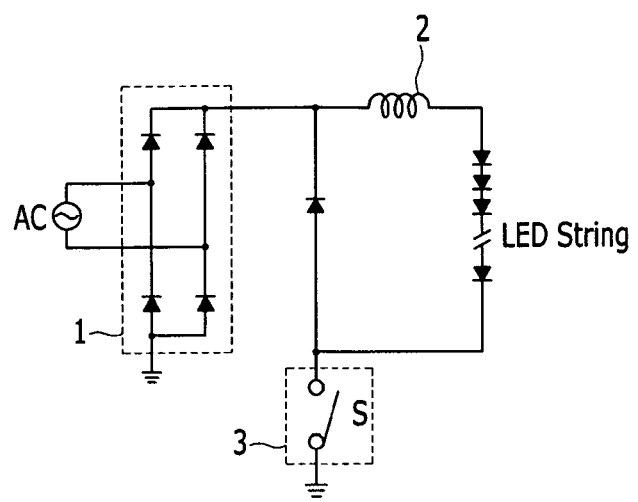
FIG. 1 is a circuit diagram illustrating a low-side buck converter for driving an LED string.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, an exemplary embodiment of the present invention will be described with reference to the accompanying drawings.

Figure 2:
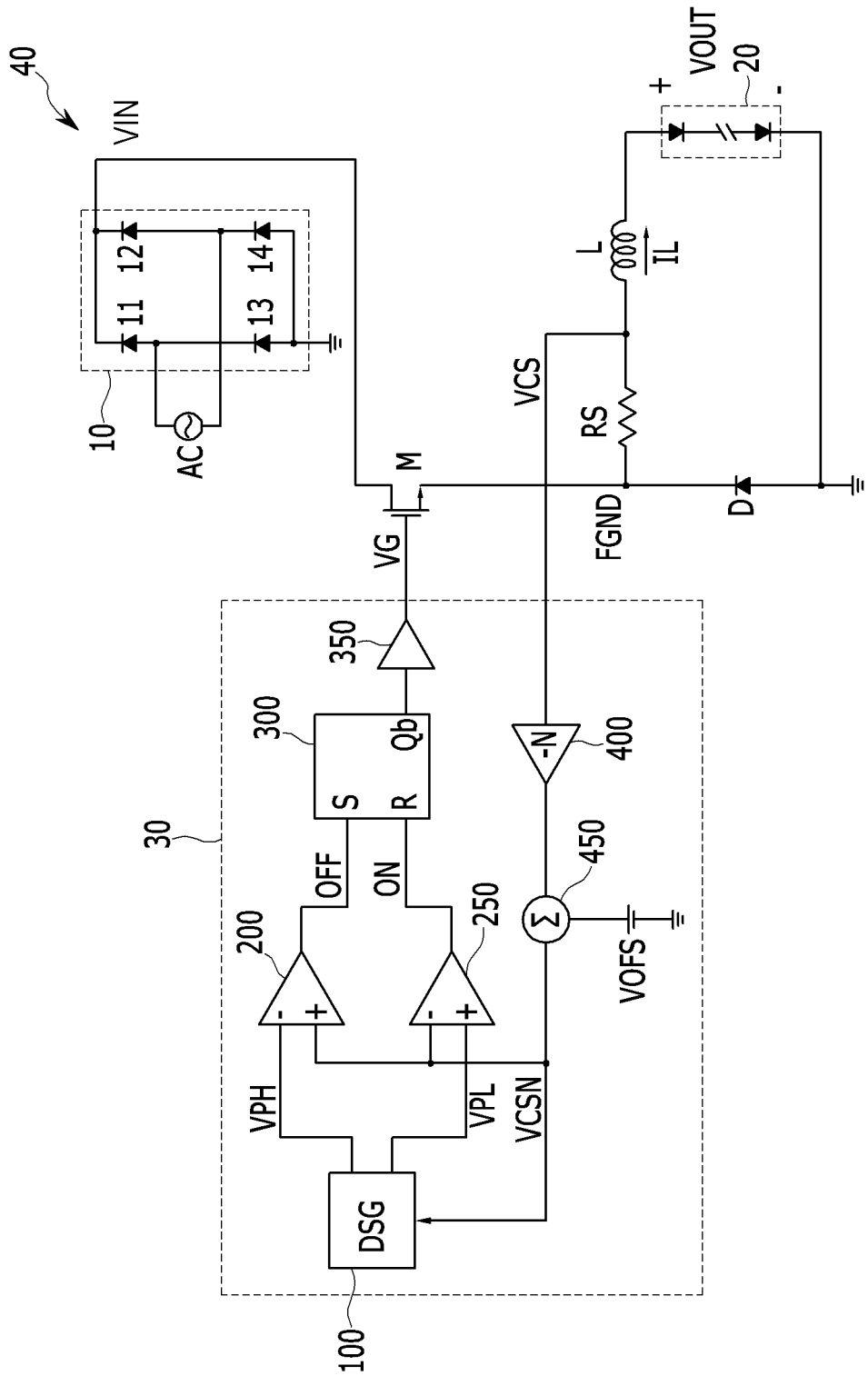
FIG. 2 is a circuit diagram illustrating a switch controller and a power supply device including the same according to an exemplary embodiment of the present invention.

FIG. 2 is a circuit diagram illustrating a switch controller and a power supply device including the same according to an exemplary embodiment of the present invention.

The power supply device according to the exemplary embodiment of the present invention is implemented by a high-side buck converter. In the high-side buck converter, a drain electrode of a power switch M is directly connected to an input voltage VIN.

The input voltage VIN according to the exemplary embodiment of the present invention is a voltage generated by full-wave rectifying an AC input AC. Different from the high-side buck converter according to the exemplary embodiment of the present invention, the power switch S of the low-side buck according to the conventional art is connected between a ground and a LED string.

As shown in FIG. 2, the power switch M performs a switching operation according to a gate signal VG received from the switch controller 30. The power switch M is implemented by an n-channel metal oxide semiconductor filed effect transistor (NMOSFET). The present invention is not limited thereto, but another type of transistor is applicable to the present invention.

A power supply device 40 includes a power switch M, a bridge diode 10, a diode D, an inductor L, and a switch controller 30. The switch controller 30 and the power switch M are integrated with each other in a package as one chip.

The bridge diode 10 includes four diodes 11 to 14, and full-wave rectifiers an input AC power source AC to generate an input voltage VIN. The input voltage VIN has a full-wave rectification waveform.

The power switch M includes a drain electrode connected to an output terminal of the bridge diode 11, a gate electrode to which a gate signal VG from the switch controller 30 is input, and a source electrode connected to a floating ground FGND.

The LED string 20 includes a plurality of LED devices which are connected to each other in series.

A sensing resistor RS includes one terminal connected to the floating ground FGND and the other terminal connected to one terminal of the inductor L. A sensing voltage VCS generated by passing a current (hereinafter referred to as 'LED current ILED') flowing through the LED string 20 through the sensing resistor RS is used to control zero crossing detection of the input voltage VIN and a switching operation. Since the sensing voltage VCS has a potential lower than that of the floating ground FGND, the sensing voltage VCS is always a negative voltage.

The other terminal of the inductor L is connected to one terminal of the LED string 20, and the other terminal of the LED string 20 is connected to a ground. Accordingly, the current (IL) flowing through the inductor L is supplied to the LED string 20, and the LED 20 emits light according to the inductor current IL.

The diode D is connected between the floating ground FGND and the ground. The current flowing through the LED string 20 passes through the diode D during an off period of the power switch M.

If the power switch M is turned-on, energy starts to be accumulated in the inductor L according to an input voltage VIN. During an on period of the power switch M, the energy is accumulated in the inductor L, and the inductor current IL is increased. In this case, the inductor current IL flows to the ground through the LED string 20.

If the power switch M is turned-off, the energy accumulated in the inductor L starts to be reduced. During an off period of the power switch M, the energy in the inductor L is reduced so that the inductor current IL is reduced. In this case, the inductor current IL is free-wheeled through the LED string 20 and the diode D.

The switch controller 30 detects a zero crossing time point of the input voltage VIN using the sensing voltage VCS, and generates a high peak signal VPH and a low peak signal VPL having a phase and a waveform in synchronization with the input voltage VIN using the detected zero crossing time point. The switch controller 30 controls a switching operation of the power switch M using the sensing voltage VCS, the high peak signal VPH, and the low peak signal VPL.

The switch controller 30 includes a digital sine-wave generator (hereinafter referred to as 'DSG') 100, a high peak comparator 200, a low peak comparator 250, an SR flip-flop 300, gate driver 350, an inverting amplifier 400, and an offset adder 450.

In a buck converter, an output voltage VOUT is controlled to be equal to or less than the input voltage VIN. In this case, the output voltage VOUT is a value n*VF obtained by multiplying the number n of LEDS constituting the LED string by a forwarding voltage VF, and the forwarding voltage VF refers to a voltage difference across the LED when a current flows through the LED.

If the input voltage VIN is less than a desired output voltage VOUT, the output voltage is not controlled to a described level and an output current does not flow to an output terminal. Accordingly, the current does not flow through the sensing resistor RS so that the sensing voltage VCS has the same potential as that of the floating ground FGND.

In then exemplary embodiment of the present invention, the output current, that is, the LED current ILED is the same as the current flowing through the sensing resistor RS. Accordingly, the output current (or LED current) is detected as the sensing voltage VCS detected by the sensing resistor RS.

For example, when the input voltage VIN is approximately a zero voltage, the input voltage VIN is less than an output voltage VOUT of desire level so that the LED current ILED is not generated. Accordingly, the sensing voltage VCS has the same potential as that of the floating ground FGND.

The switch controller 30 inverting-amplifies the sensing voltage VCS and adds the predetermined offset voltage VOFS to the amplified voltage to generate a modulation sensing voltage VCSN. The modulation sensing voltage VCSN and the LED current ILED have a similar waveform. Accordingly, when the input voltage VIN is approximately the zero voltage, the modulation sensing voltage VCSN has the lowermost potential. The exemplary embodiment of the present invention may detect a zero voltage crossing time point using the modulation sensing voltage VCSN.

In detail, the inverting amplifier 400 amplifies the sensing voltage VCS −N times, and the offset adder 450 adds an offset voltage VOFS to the output of the inverting amplifier 400 to generate the modulation sensing voltage VCSN.

The switch controller 30 detects a period (hereinafter referred to as 'zero crossing detection period') when the modulation sensing voltage VCSN is less than the low peak reference VPL, and may determine a middle time of the zero crossing detection period as the zero crossing time point. A method of determining the zero crossing time point during the zero crossing detection period by the switch controller 30 may be changed. For example, the switch controller 30 may determine an optional time point, a start time point, or an end time point of the zero crossing detection period as the zero crossing time point.

The DSG 100 detects the zero crossing detection period using the modulation sensing voltage VCSN, determines the zero crossing time point during the detected zero crossing detection period to set one a period of the input voltage VIN, and generates a high peak reference VPH and the low peak reference VPL depending on a full rectification sine-wave during one period of a set input voltage VIN.

The peak reference VPH is a reference to control a high peak of a current (hereinafter referred to as 'LED current') flowing through the LED string 20, and the low peak reference VPL is a reference to control a low peak of the LED current ILED.

The high peak refers to an upper limit of an LED current ILED increased during an on period of the power switch M, and The low peak refers to a lower limit of an LED current ILED reduced during an off period of the power switch M.

Figure 3:
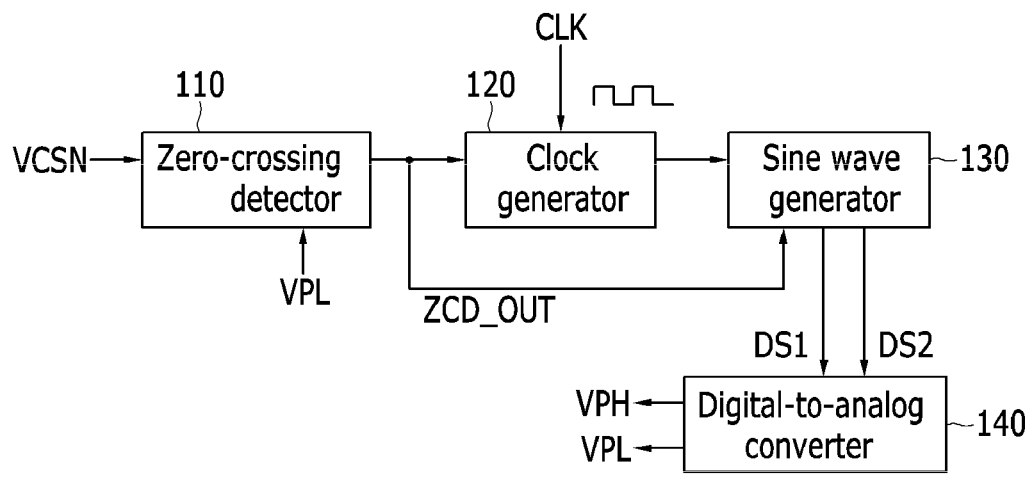
FIG. 3 is a circuit diagram illustrating a digital sine-wave generator (DSG) according to an exemplary embodiment of the present invention.
Figure 4:
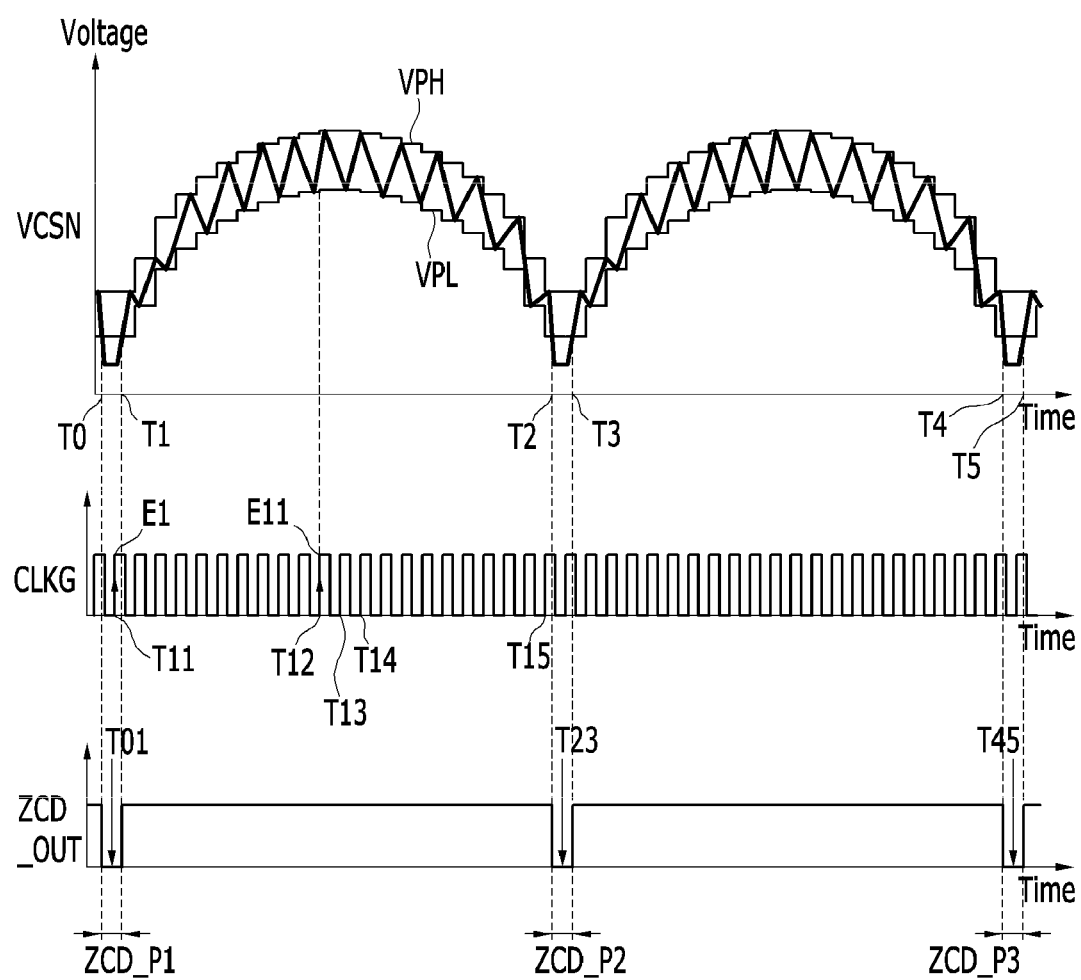
FIG. 4 is waveform diagram illustrating a modulation sensing voltage, a zero crossing detection signal, a sine-wave clock signal, a high peak reference, and a low peak reference generated by the exemplary embodiment of the present invention.

Referring to FIGS. 3 and 4, the DSG 100 according to the exemplary embodiment of the present invention will be described.

FIG. 3 is a circuit diagram illustrating a DSG according to an exemplary embodiment of the present invention.

FIG. 4 is waveform diagram illustrating a modulation sensing voltage, a zero crossing detection signal, a sine-wave clock signal, a high peak reference, and a low peak reference generated by the exemplary embodiment of the present invention.

As shown in FIG. 3, the DSG 100 includes a zero crossing detector 110, a clock generator 120, a sine-wave generator 130, and a digital-analog converter (DAC) 140.

The zero crossing detector 110 receives a modulation sensing voltage VCSN and a low peak reference VPL, detects a zero crossing detection period when the modulation sensing voltage VCSN is less than the low peak reference VPL, and generates a zero crossing detection signal ZCD_OUT according to the detected result.

A ZCD_P1 being a part of the first zero crossing detection period, the second zero crossing detection period ZCD_P2, and the third zero crossing detection period ZCD_P3 are illustrated in FIG. 4. A zero crossing detection signal ZCD_OUT according to the exemplary embodiment of the present invention is at a low level during the zero crossing detection period. The zero crossing detection signal ZCD_OUT is at a high level during remaining periods.

The clock generator 120 receives the zero crossing detection signal ZCD_OUT and a predetermined clock signal CLK, sets one period of an input voltage VIN using the zero crossing detection signal ZCD_OUT, and generates a sine-wave clock signal CLKG having a predetermined frequency during the one set period.

The clock generator 120 estimates continuous zero crossing time points using the zero crossing detection signal ZCD_OUT, and sets an interval between the estimated zero crossing time points as one period of the input voltage VIN. For example, the clock generator 120 estimates one time point during a period when the zero crossing detection signal ZCD_OUT is at a low level as the zero crossing time point, estimates one time point during a period when the zero crossing detection signal ZCD_OUT is at a high level as a next zero crossing time point, and sets an interval between the zero crossing time point and the next zero crossing time point as one of the input periods (VIN).

The clock generator 120 generates a sine-wave clock signal CLKG having a predetermined number of edges during one period of the predetermined input voltage VIN. In detail, the clock generator 120 divides a predetermined clock signal CLK to generate the sine-wave clock signal CLKG having a predetermined number of edges during one period of an estimated input voltage VIN. In this case, the predetermined number may be suitably set so that the high peak reference VPH and the low peak reference VPL have a sine-wave similar to that of the input voltage VIN. Hereinafter, the number of edges of the sine-wave clock signal CLKG during one period of the input voltage VIN refers to a reference number of times.

For example, a reduced modulation sensing voltage (VCSN) is set to reach a peak reference VPL at a time point T0, and a voltage VCSN increased according to increase of the input voltage VIN after the zero voltage crossing is set to reach the low peak reference VPL at a time point T1.

Further, the modulation sensing voltage VCSN is set to reach the low peak reference VPL at time points T2 and T3, and is set to reach the low peak reference VPL at time points T4 and T5. The clock generator 120 according to the exemplary embodiment of the present invention sets to estimate a middle time point of the zero crossing detection period as the zero crossing time point.

The clock generator 120 sets periods T01 to T23 as one period of the input voltage VIN, and generates a sine-wave clock signal CLKG of a frequency having a rising edge of a reference number of times (e.g., 22 times) during the one set period after a time point T23. That is, a frequency of a clock signal CLKG during periods T23 to T45 is determined according to a period (T01 to T23) just before the input signal VIN.

During periods T01 to T23, a frequency of a sine-wave clock signal CLKG generated form the clock generator 120 is determined according to a period just before the input signal VIN based on the time point T01.

The sine-wave generator 130 generates a first digital signal DS1 and the second digital signal DS2 increased and reduced by the reference number of times for each period of the set input voltage VIN according to the sine-wave clock signal CLKG. The sine-wave generator 130 serially arranges a plurality of digital values indicating a high peak reference VPH varying for each period of the sine-wave clock signal CLKG to generate the first digital signal DS1, and serially arranges a plurality of digital values indicating a low peak reference VPL varying for each period of the sine-wave clock signal CLKG to generate the second digital signal DS2.

The sine-wave generator 130 may receive a zero crossing detection signal ZCD_OUT in order to generate the first digital signal DS1 and the second digital signal DS2 for each period of the input voltage VIN.

For example, each of the first digital signal DS1 and the second digital signal DS2 may be a digital signal in n bit units. That is, each of the high peak reference VPH and the low peak reference VPL varying in synchronization with the sine-wave clock signal CLKG is denoted as an n bit digital value. An increase amount or a reduction amount of each of the first digital signal DS1 and the second digital signal DS2 is set to maintain an interval as illustrated in FIG. 4 as each of the high peak reference VPH and the low peak reference VPL implements a sine-wave.

The DAC 140 converts the first input digital signal DS1 and the second input digital signal DS2 into analog voltage signals in real time to generate and output the high peak reference VPH and the low peak reference VPL.

Then, as shown in FIG. 4, the high peak reference VPH and the low peak reference VPL are generated depending on a sine-wave, which are increased or reduced in synchronization with a rising edge of the sine-wave clock signal CLKG.

As shown in FIG. 4, during a period from a time point T11 when a first edge E1 of a sine-wave clock signal GCLK generated after the zero crossing time point T10 is generated to a time point T12 when an eleventh edge is generated, the first digital signal DS1 and the second digital signal DS2 are increased, and the peak reference VPH and the low peak reference VPL are increased in synchronization with a rising edge of the sine-wave clock signal CLKG.

In the exemplary embodiment of the present invention, at the time point T11, the first digital signal DS1 and the second digital signal DS2 are not increased, and the high peak reference VPH and the low peak reference VPL are not increased. A period maintaining a constant value is set in order to detect the zero crossing detection period of the input voltage VIN using the high peak reference VPH and the low peak reference VPL.

During a period from a generation time point T13 of an twelfth edge E12 to a generation time point T15 of a twenty-second edge, the first digital signal DS1 and the second digital signal DS2 are reduced, and the peak reference VPH and the low peak reference VPL are reduced in synchronization with a rising edge of the sine-wave clock signal CLKG.

In the exemplary embodiment of the present invention, at the time point T13, the first digital signal DS1 and the second digital signal DS2 are not reduced, and the high peak reference VPH and the low peak reference VPL are not reduced. This is change of a design to implement a waveform similar to a sine wave, but the present invention is not limited thereto.

The DSG 100 according to the exemplary embodiment of the present invention sets a middle time point of the zero crossing detection period or a rising edge or a falling edge of the zero crossing detection signal ZCD_OUT, or an optional time point of the zero crossing detection period as the zero crossing time point. The zero crossing detection period is very short, and an optional time point, a rising edge time point, and a falling edge time point there may be very close to each other in the time.

The high peak comparator 200 generates an OFF signal for controlling turning-off of the power switch M according to a comparison result of the modulation sensing voltage VCSN with and the high peak reference VPH.

The modulation sensing voltage VCSN is input to a non-inverting terminal (+) of the high peak comparator 200, and the high peak reference VPH is input to an inverting terminal (−) of the high peak comparator 200. If a signal input to the non-inverting terminal (+) is equal or greater than a signal input to the inverting terminal (−), the high peak comparator 200 outputs an OFF signal of high level. Otherwise, the high peak comparator 200 outputs an OFF signal of low level.

The low peak comparator 250 generates an ON signal for controlling turning-on of the power switch M according to a comparison result of the modulation sensing voltage VCSN with and the low peak reference VPL.

The modulation sensing voltage VCSN is input to an inverting terminal (−) of the low peak comparator 250, and the low peak reference VPL is input to a non-inverting terminal (+) of the low peak comparator 250. If a signal input to the non-inverting terminal (+) is equal or greater than a signal input to the inverting terminal (−), the low peak comparator 250 outputs an ON signal of high level. Otherwise, the low peak comparator 250 outputs an ON signal of low level.

The SR flip-flop 300 generates a gate control signal VGC of a level for controlling turning-on of the power switch M according to an ON signal, and generates a gate control signal VGC of a level for controlling turning-off of the power switch M according to an OFF signal.

If a signal input to a set terminal S is at a high level, the SR flip-flop 300 generates a gate control signal VGC of a low level and outputs the generated gate control signal VGC through an inverting output terminal Qb. If a signal input to a reset terminal R is at a high level, the SR flip-flop 300 generates a gate control signal VGC of a high level and outputs the generated gate control signal VGC through the inverting output terminal Qb. The ON signal is input to a reset terminal R of the SR flip-flop 300, and the OFF signal is input to the set terminal S of the SR flip-flop 300.

Accordingly, when the modulation sensing voltage VCSN reaches the high peak reference VPH so the OFF signal of a high level is generated, the SR flip-flop 300 generates a gate control signal VGC of a low level. When the modulation sensing voltage VCSN reaches the low peak reference VPL so the ON signal of a high level is generated, the SR flip-flop 300 generates a gate control signal VGC of a high level.

The gate driver 350 generates a gate signal VG for controlling a switching operation of the power switch M according to a gate control signal VGC. When the gate signal VG is at a high level, the power switch M is turned-on. When the gate signal VG is at a low level, the power switch M is turned-off. The gate driver 350 generates a gate signal VG of a high level according to a gate control signal VGC of a high level, and generates a gate signal VG of a low level according to a gate control signal VGC of a low level.

Figure 5:
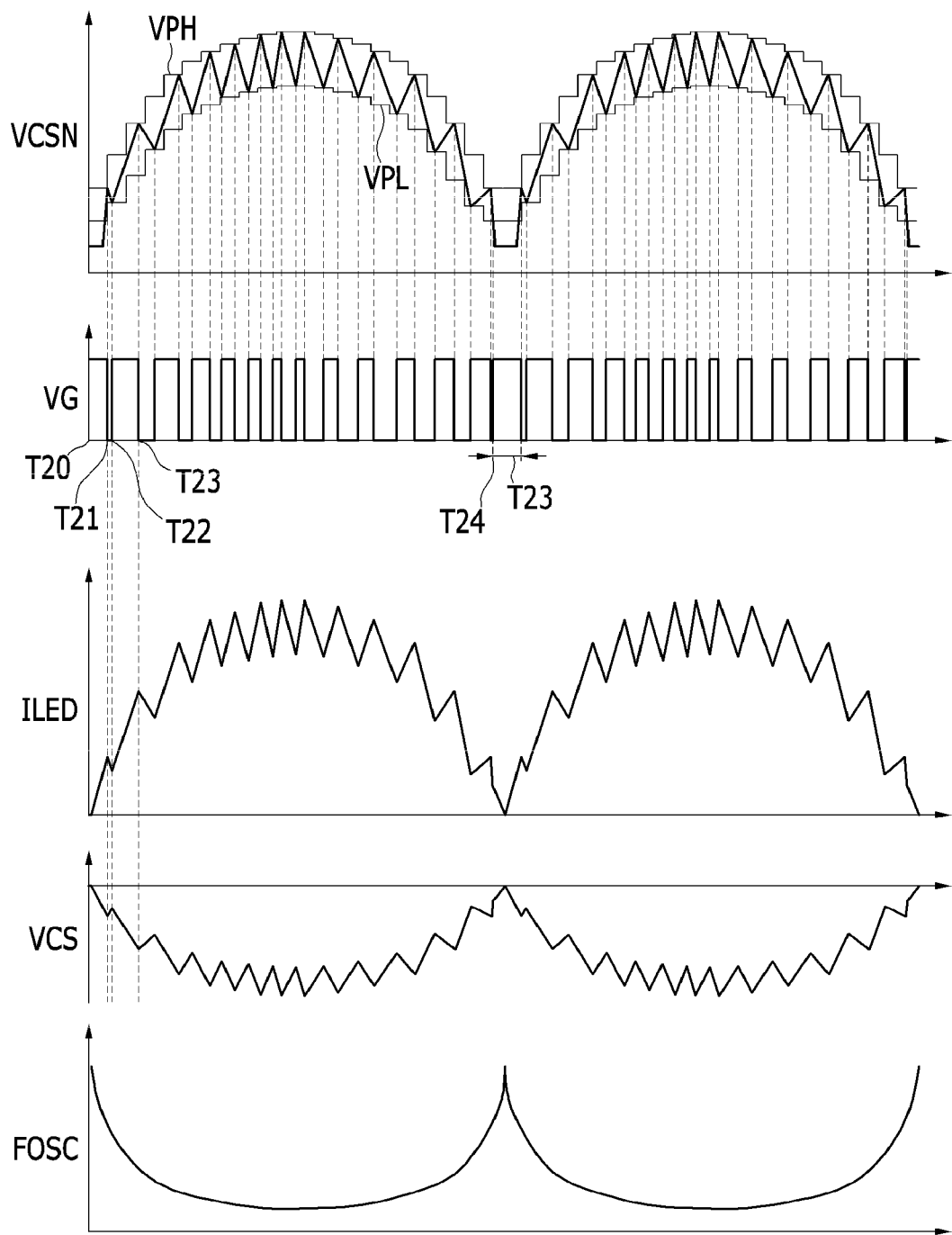
FIG. 5 is a waveform diagram illustrating a high peak reference, a low peak signal, a modulation sensing voltage, a gate signal, a sensing voltage, an LED current, and a switching frequency according to the exemplary embodiment of the present invention.

FIG. 5 is a waveform diagram illustrating a high peak reference, a low peak signal, a modulation sensing voltage, a gate signal, a sensing voltage, an LED current, and a switching frequency according to the exemplary embodiment of the present invention.

An LED current ILED is increased during a high level period (On period of power switch M) of the gate signal VG, and is reduced during a low level period (OFF period of power switch M) of the gate signal VG, and the sensing voltage VCS varies with the LED current ILED. However, the sensing voltage VCS is a negative voltage, which varies with variation and a reverse phase of the LED current ILED.

That is, as shown in FIG. 5, while the LED current ILED is increased, a negative sensing voltage VCS is reduced. While the LED current ILED is reduced, the negative sensing voltage VCS is increased.

The sensing voltage VCS is amplified −N times and an offset voltage VOFS is added to the amplified voltage to generate a modulation sensing voltage VCSN as shown in FIG. 5. That is, the modulation sensing voltage VCSN is increased during an ON period of the power switch M. The modulation sensing voltage VCSN is reduced during an OFF period of the power switch M.

At a time point (e.g., T21) when the modulation sensing voltage VCSN reaches the high peak reference VPH, the gate signal VG becomes a low level so that the power switch M is turned-off. Then, from the time point T21, the LED current ILED is reduced, the negative sensing voltage VCS is increased, and the modulation sensing voltage VCSN is reduced.

When the reduced modulation detection modulation sensing voltage VCSN reaches the low peak reference VPL at a time point (e.g., T22), the gate signal VG becomes a high level so that the power switch M is turned-on. Then, from the time point T22, the LED current ILED is increased, the negative sensing voltage VCS is reduced, but the modulation sensing voltage VCSN is increased.

When the increased modulation detection modulation sensing voltage VCSN reaches the high peak reference VPH at a time point (e.g., T23), the gate signal VG becomes a low level so that the power switch M is turned-off. Then, from the time point T23, the LED current ILED is reduced, the negative sensing voltage VCS is increased, but the modulation sensing voltage VCSN is reduced.

In this manner, a switching operation is controlled according to the modulation sensing voltage VCSN, the peak reference VPH, and the low peak reference VPL.

However, among periods T20 to T21 and T23, during a period inkling a zero crossing detection period, the switch M is turned-on according to a gate signal VG of a high level, the input voltage VIN is approximately a zero voltage. Accordingly, a period when the modulation sensing voltage VCSN does not vary with a switching operation is generated.

For example, the modulation sensing voltage VCSN reaches a low peak reference VPL at a time point T24 so that the power switch M is turned-on according to the gate signal VG of a high level, but the modulation sensing voltage VCSN is reduced without increase.

Further, as the input voltage VIN is increased, a switching frequency Fosc is reduced. As the input voltage VIN is reduced, the switching frequency Fosc is increased.

In this manner, the power supply device according to the exemplary embodiment of the present invention may estimate a zero crossing time point of an input voltage using a sensing voltage depending on an LED current, and set a high peak reference and a low peak reference depending on a phase and a waveform of an input voltage, so that ripple of the LED current can be controlled. Accordingly, a CC characteristic is improved.

In addition, during one period of the input voltage, an interval between the high peak reference and the low peak reference may be changed according to magnitude of the input voltage. When the input voltage is high during one period of the input voltage, the interval between the high peak reference and the low peak reference is wide. When the input voltage is low during one period of the input voltage, the interval between the high peak reference and the low peak reference is narrow. Accordingly, the switching frequency varies so that an EMI characteristic is improved.

Different from the buck converter according to the conventional art where a duty is limited to 50% or slope compensation must be performed, the present invention may use a duty of 50% or greater and does not require separate slope compensation.

Further, since a voltage across an LED string according to the conventional art is a high voltage, it difficult to detect the voltage across the LED string. However, in the exemplary embodiment of the present invention, since the LED string is connected to the floating ground, it is easy to detect the voltage across the LED string.

The foregoing embodiment has illustrates a case where an input of the power supply device is AC.

Hereinafter, a case where an input of the power supply device is DC will be described. When the input of the power supply device is DC, an input voltage VIN has a constant value. Accordingly, when the input of the power supply device is DC, the high peak reference and the low peak reference does not depend on a sine-wave but have a constant value.

In a case of a DC input, the switch controller 30 sets the high peak reference and the low peak reference to predetermined values, respectively. When the modulation sensing voltage VCSN reaches the high peak reference, the switch controller 30 turns-off the power switch M. When the modulation sensing voltage VCSN reaches the low peak reference, the switch controller 30 turns-on the power switch M.

Figure 6:
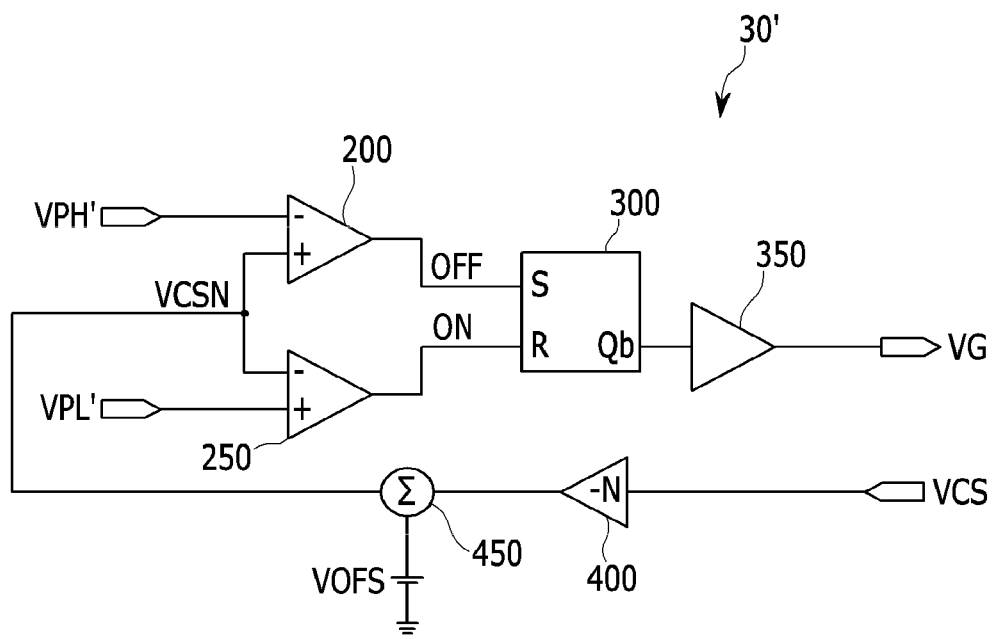
FIG. 6 is a circuit diagram illustrating a switch controller according to another exemplary embodiment of the present invention.

FIG. 6 is a circuit diagram illustrating a switch controller according to another exemplary embodiment of the present invention.

Upon comparing a switching controller 30' shown in FIG. 6 with the switching controller 30 according to the exemplary embodiment, the difference is that a high peak reference VPH' and a low peak reference VPL' are fixed to a constant voltage according to a DC input. The same components will be assigned with the same reference numerals.

Although a digital sine-wave generator is not shown in FIG. 6, the digital sine-wave generator may be included in the switch controller 30'. In the case of the DC input, a zero crossing detection signal ZCD_OUT is always held at a high level (or low level), and the digital sine-wave generator may output a constant high peak reference VPH' and a constant low peak reference VPL' rather than a digital sine wave.

Figure 7:
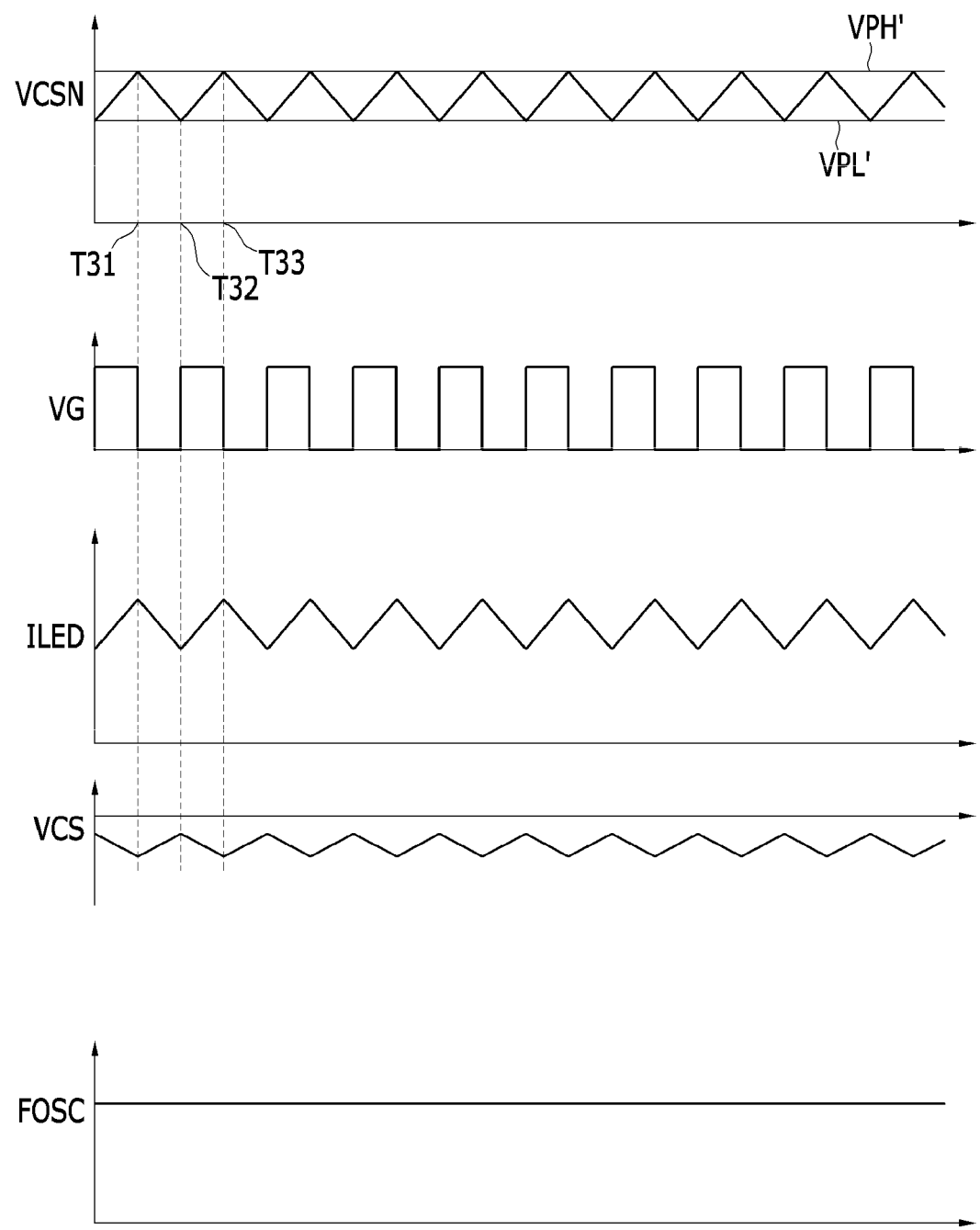
FIG. 7 is a waveform diagram illustrating a high peak reference, a low peak signal, a modulation sensing voltage, a gate signal, a sensing voltage, an LED current, and a switching frequency according to another exemplary embodiment of the present invention.

FIG. 7 is a waveform diagram illustrating a high peak reference, a low peak signal, a modulation sensing voltage, a gate signal, a sensing voltage, an LED current, and a switching frequency according to another exemplary embodiment of the present invention.

As shown in FIG. 7, if a modulation sensing voltage VCSN reaches the high peak reference VPH' at a time point T31, a gate signal VG becomes a low level according to an OFF signal of a high level. Accordingly, the switch M is turned-off.

Then, from the time point T31, an LED current ILED is reduced, a negative sensing voltage VCS is increased, but the modulation sensing voltage VCSN is reduced.

When the reduced modulation detection modulation sensing voltage VCSN reaches the low peak reference VPL at a time point T32, the gate signal VG becomes a high level according to an ON signal of a high level. Accordingly, the power switch M is turned-on.

Then, from the time point T32, the LED current ILED is increased, the negative sensing voltage VCS is reduced, but the modulation sensing voltage VCSN is increased.

When the increased modulation detection modulation sensing voltage VCSN reaches the high peak reference VPH' at a time point T33, the gate signal VG becomes a low level according to an OFF signal of a high level. Accordingly, the power switch M is turned-off.

Then, from the time point T33, the LED current ILED is reduced, the negative sensing voltage VCS is increased, but the modulation sensing voltage VCSN is reduced.

In this manner, since the LED current ILED is controlled according to the peak reference VPH and the low peak reference VPL which are fixed to a constant value, a switching frequency Fosc has a constant value.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

Power supply device 40, power switch M, bridge diode 10 diode (D) 11 to 14, inductor L, switch controller 30, LED string 20
digital sine-wave generator 100, high peak comparator 200, low peak comparator 250
SR flip-flop 300, gate driver 350, inverting amplifier 400 offset adder 450, zero crossing detector 110, clock generator 120
Sine-wave generating unit 130, digital-analog converter 140

What is claimed is:

1. A switch controller circuit comprising:
a sensing circuit to receive a sensing voltage corresponding to a load current and generate a modulation sensing voltage using the sensing voltage, the load current being generated by rectifying an Alternating Current (AC) input voltage;
a digital sine-wave generator to:
detect, using the modulation sensing voltage, a zero crossing detection period signal,
determine a zero crossing time during the detected zero crossing detection,
determine a sine wave period according to the zero crossing time, and
generate first and second references based on a full-wave rectification sine-wave having the sine wave period; and
a switch control signal generation circuit to generate a switch control signal using the modulation sensing voltage, the first reference, and the second reference, the switch control signal generation circuit configured to:
assert the switch control signal in response to the modulation sensing voltage being less than or equal to the second reference, and
de-assert the switch control signal in response to the modulation sensing voltage begin greater than or equal to the first reference,
wherein the first reference has a first waveform including an AC component, the AC component of the first waveform having a phase synchronized with a phase of the AC input voltage,
wherein the second reference is less than the first reference and has a second waveform including an AC component, the AC component of the second waveform having a phase synchronized with the phase of the AC input voltage.

2. The switch controller circuit of claim 1, wherein the sensing circuit is configured to invert-amplify the sensing voltage and add a predetermined offset voltage to the amplified sensing voltage to generate the modulation sensing voltage.

3. The switch controller circuit of claim 1, wherein the digital sine-wave generator is configured to detect the zero crossing detection period using the modulation sensing voltage, and wherein the zero crossing detection period corresponds to a zero crossing of the AC input voltage.

4. The switch controller circuit of claim 3, wherein the digital sine-wave generator comprises:
a zero crossing detector configured to receive the modulation sensing voltage and the second reference, detect a period when the modulation sensing voltage is less than the second reference as the zero crossing detection period and generate a zero crossing detection signal according to the detected result;
a clock generator configured to receive the zero crossing detection signal, estimate consecutive zero crossing times based on the zero crossing detection signal, set an interval between the estimated consecutive zero crossing times as the sine wave period, and generate a clock signal having a reference number of rising edges during the sine wave period;
a sine-wave generator configured to generate a first digital signal and a second digital signal to be increased and reduced corresponding to the reference number of times according to the clock signal during the sine wave period; and
a digital-to-analog converter configured to generate the first reference and the second reference by convert the first digital signal and the second digital signal into respective analog voltage signals.

5. The switch controller circuit of claim 4, wherein the clock generator is configured to set an interval between a first time when the zero crossing detection signal is at a low level and a second time when the zero crossing detection signal is at the low level as the sine wave period.

6. The switch controller circuit of claim 4, wherein the sine-wave generator is configured to:
serially arrange a first plurality of digital values indicating the first reference varying for each sine wave period of the clock signal based on the zero crossing detection signal to generate the first digital signal; and
serially arrange a second plurality of digital values indicating the second reference varying for each sine wave period of the clock signal based on the zero crossing detection signal to generate the second digital signal.

7. The switch controller circuit of claim 1, wherein the switch control signal generation circuit comprises:
a high peak comparator configured to generate an OFF signal based on a result of a comparison between the modulation sensing voltage and the first reference;
a low peak comparator configured to generate an ON signal based on a result of a comparison between the modulation sensing voltage and the second reference;
an SR flip-flop configured to assert the switch control signal in response to an assertion of the ON signal and de-assert the switch control signal is response to an assertion of the OFF signal.

8. A switch controller circuit comprising:
a sensing circuit to receive a sensing voltage corresponding to a load current and generate a modulation sensing voltage using the sensing voltage, the load current being generated by rectifying an Alternating Current (AC) input voltage;
a zero crossing detector circuit to generate a zero crossing detection signal indicating zero crossing detection periods of the modulation sensing voltage;
a clock generator circuit to generate, using the zero crossing detection signal, a clock signal having a predetermined number of edges between each of the zero crossing detection periods;

a sine wave generator circuit to generate, using the zero crossing detection signal and the clock signal, a first digital signal and a second digital signal;

a digital to analog converter circuit to generate, using the first digital signal, a first reference and to generate, using the second digital signal, a second reference; and a switch control signal generation circuit to generate a switch control signal using the modulation sensing voltage, the first reference, and the second reference, wherein the first reference has a first waveform including an AC component and a phase synchronized with a phase of the AC input voltage, wherein the second reference has a second waveform including an AC component and a phase synchronized with the phase of the AC input voltage, and wherein the second reference is less than the first reference.

9. The switch controller circuit of claim 8, wherein the sensing circuit comprises:
an amplifier circuit to invert-amplify the sensing voltage; and
an offset adder circuit to produce the modulation sensing voltage by adding a predetermined offset voltage to the output of the amplifier circuit.

10. The switch controller circuit of claim 8, wherein the switch control signal generation circuit comprises:
a first comparator having an inverting input coupled to the first reference and a non-inverting input coupled to the modulation sensing voltage;
a second comparator having a non-inverting input coupled to the second reference and an inverting input coupled to the modulation sensing voltage; and
an SR flip-flop having a set input coupled to the output of the first comparator and a reset input coupled to the output of the second comparator,
wherein the switch control signal is produced using an output of the SR flip-flop.

11. The switch controller circuit of claim 8, wherein the zero crossing detection periods corresponds to a zero crossing times of the AC input voltage.

12. A method for generating a switch control signal, the method comprising:
sensing, using a sensing circuit, a sensing voltage corresponding to a load current, the load current being generated by rectifying an Alternating Current (AC) input voltage;
generating a modulation sensing voltage using the sensing voltage;
detecting, by a zero crossing detector and using the modulation sensing voltage, a zero crossing detection period;
determining a zero crossing time during the zero crossing detection period,
determining a sine wave period according to the zero crossing time, and
generating, using a digital sine-wave generator, first and second references based on a full-wave rectification sine-wave having the sine wave period; and
generating, by a switch control signal generation circuit, a switch control signal, the switch control signal being generated using the modulation sensing voltage, the first reference, and the second reference, generating the switch control signal comprising:
asserting the switch control signal in response to the modulation sensing voltage being less than or equal to the second reference, and
de-asserting the switch control signal in response to the modulation sensing voltage begin greater than or equal to the first reference,
wherein the first reference has a first waveform including an AC component, the AC component of the first waveform having a phase synchronized with a phase of the AC input voltage, and
wherein the second reference is less than the first reference and has a second waveform including an AC component, the AC component of the second waveform having a phase synchronized with the phase of the AC input voltage.

13. The method of claim 12, wherein generating the modulation sensing voltage comprises invert-amplifying the sensing voltage and adding a predetermined offset voltage to the amplified sensing voltage.

14. The method of claim 12, wherein the zero crossing detection period corresponds to a zero crossing of the AC input voltage.

15. The method of claim 14, further comprising:
detecting a plurality of zero-crossing detection periods by detecting a period when the modulation sensing voltage is less than the second reference;
generating a zero crossing detection signal indicating the zero-crossing detection periods;
estimating consecutive zero crossing times based on the zero crossing detection signal;
setting an interval between the estimated consecutive zero crossing times as the sine wave period;
generating a clock signal having a reference number of rising edges during the sine wave period;
generating, using the digital sine-wave generator, a first digital signal and a second digital signal to be increased and reduced corresponding to the reference number of times according to the clock signal during the sine wave period;
generating the first reference by converting the first digital signal into a first analog voltage signal; and
generating the second reference by converting the second digital signal into a first analog voltage signal.

16. The method of claim 15, wherein setting the sine wave period includes setting an interval between a first time when the zero crossing detection signal is at a low level and a second time when the zero crossing detection signal is at the low level as the sine wave period.

17. The method of claim 15,
wherein generating the first digital signal includes serially arranging a first plurality of digital values indicating the first reference varying for each sine wave period of the clock signal based on the zero crossing detection signal; and
wherein generating the second digital signal includes serially arranging a second plurality of digital values indicating the second reference varying for each sine wave period of the clock signal based on the zero crossing detection.

18. The method of claim 12, wherein generating the switch control signal comprises:
asserting the switch control signal based on a comparison of the modulation sensing voltage and the first reference; and
de-asserting the switch control signal based on a comparison of the modulation sensing voltage and the second reference.

* * * * *